(12) United States Patent
Yaney

(10) Patent No.: US 7,468,657 B2
(45) Date of Patent: Dec. 23, 2008

(54) SYSTEM AND METHOD FOR DETECTING NOISE SOURCE IN A POWER LINE COMMUNICATIONS SYSTEM

(75) Inventor: David Stanley Yaney, Poolesville, MD (US)

(73) Assignee: Current Technologies, LLC, Germantown, MD (US)

( * ) Notice: Subject to any disclaimer, the term of this patent is extended or adjusted under 35 U.S.C. 154(b) by 388 days.

(21) Appl. No.: 11/341,645

(22) Filed: Jan. 30, 2006

(65) Prior Publication Data

US 2007/0179721 A1     Aug. 2, 2007

(51) Int. Cl.
*G08B 1/08* (2006.01)

(52) U.S. Cl. ............. 340/538; 340/538.12; 340/310.16; 702/59

(58) Field of Classification Search ................. 340/538, 340/538.12, 310.13, 310.16; 702/59; 324/512, 324/534; 375/259, 288
See application file for complete search history.

(56) References Cited

U.S. PATENT DOCUMENTS

| | | | |
|---|---|---|---|
| 4,570,231 A * | 2/1986 | Bunch ......................... 702/59 |
| 4,635,055 A | 1/1987 | Fernandes et al. |
| 4,758,962 A | 7/1988 | Fernandes |
| 5,006,846 A | 4/1991 | Granville et al. |
| 5,369,356 A | 11/1994 | Kinney et al. |
| 5,498,956 A | 3/1996 | Kinney et al. |
| 5,760,492 A | 6/1998 | Kanoi et al. |
| 5,777,545 A | 7/1998 | Patel et al. |
| 6,151,330 A | 11/2000 | Liberman |
| 6,822,457 B2 * | 11/2004 | Borchert et al. ............. 324/512 |
| 6,828,770 B1 | 12/2004 | McCauley et al. |
| 6,917,888 B2 * | 7/2005 | Logvinov et al. ............. 702/59 |
| 7,089,125 B2 | 8/2006 | Sonderegger |
| 7,321,291 B2 * | 1/2008 | Gidge et al. ................. 340/531 |
| 2001/0052843 A1 | 12/2001 | Wiesman et al. |
| 2002/0000802 A1 | 1/2002 | Panto et al. |
| 2003/0067725 A1 | 4/2003 | Horvath et al. |
| 2003/0105608 A1 | 6/2003 | Hart |
| 2003/0137388 A1 | 7/2003 | Meier et al. |
| 2004/0021455 A1 | 2/2004 | Staats |
| 2004/0160227 A1 | 8/2004 | Piesinger |
| 2004/0183522 A1 | 9/2004 | Gunn |
| 2004/0212512 A1 | 10/2004 | Stewart |
| 2005/0040809 A1 | 2/2005 | Uber, III et al. |
| 2005/0083206 A1 | 4/2005 | Couch et al. |
| 2005/0141682 A1 | 6/2005 | Wells |

(Continued)

OTHER PUBLICATIONS

"Centralized Commercial Building Applications with the Lonworks® PLT-21 Power Line Transceiver", *Lonworks Engineering Bulletin*, Echelon, (Apr. 1997), 1-22.

*Primary Examiner*—Toan N Pham
(74) *Attorney, Agent, or Firm*—Mel Barnes; Capital Legal Group, LLC

(57) ABSTRACT

A method for detecting noise location information in a power line distribution system is disclosed. In one embodiment, the method includes the steps of receiving link quality data for a first power line communication link between a first and second power line communications device, determining an asymmetry in the link quality data of the link, and determining location information for the noise source based on the location of the first power line communications device or the location of the second power line communications device.

33 Claims, 4 Drawing Sheets

U.S. PATENT DOCUMENTS

| | | |
|---|---|---|
| 2006/0007016 A1 | 1/2006 | Borkowski et al. |
| 2006/0036795 A1 | 2/2006 | Leach |
| 2006/0060007 A1 | 3/2006 | Mekhanoshin et al. |
| 2006/0076946 A1 | 4/2006 | Shvach et al. |
| 2006/0084419 A1 | 4/2006 | Rocamora et al. |
| 2006/0087777 A1 | 4/2006 | Bruno |
| 2006/0106554 A1 | 5/2006 | Borkowski et al. |
| 2006/0187074 A1 | 8/2006 | O'Sullivan et al. |
| 2006/0192672 A1 | 8/2006 | Gidge et al. |
| 2006/0195229 A1 | 8/2006 | Bell et al. |
| 2006/0217058 A1 | 9/2006 | Staszesky et al. |
| 2006/0241880 A1 | 10/2006 | Forth et al. |
| 2006/0271313 A1 | 11/2006 | Mollenlopf |
| 2006/0284647 A1 | 12/2006 | Gunn et al. |
| 2007/0014313 A1 | 1/2007 | Bickel et al. |
| 2007/0024264 A1 | 2/2007 | Lestician |
| 2007/0090811 A1 | 4/2007 | Labuschagne |
| 2007/0136010 A1 | 6/2007 | Gunn et al. |
| 2007/0179721 A1 | 8/2007 | Yaney |
| 2007/0179726 A1 | 8/2007 | Bickel |
| 2007/0203658 A1 | 8/2007 | Pater |

* cited by examiner

SYSTEM AND METHOD FOR DETECTING NOISE SOURCE IN A POWER LINE COMMUNICATIONS SYSTEM

FIELD OF THE INVENTION

The present invention generally relates to data communications over a power distribution system and more particularly, to a system and method for determining information of the location of a noise source in power line communications systems.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices can be used to carry data signals to and from the homes and offices. These data signals are communicated on and off the power lines at various points in the power line communication system, such as, for example, near homes, offices, Internet service providers, and the like.

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts(V) and 1,000V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. Overhead MV power line conductors, which are typically not insulated conductors, are typically insulated from utility poles and other support infrastructure by electrical insulators. The transition from the MV section to the LV section of the power distribution system typically is accomplished with a distribution transformer, which converts the higher voltage of the MV section to the lower voltage of the LV section. PLCSs may communicate over both the MV and LV power lines.

A common problem encountered during data communication in PLCSs is noise generated by the various components of the electrical distribution system. Ingress noise may also be coupled into the PLCS system from the general RF (radio frequency) environment as the power lines themselves act as antennas. It is therefore convenient to categorize the observed noise into two components, the first of which has a strong 60 or 120 Hz periodicity ("buzz" noise) and a second in which the 60 or 120 Hz periodicity is weak or entirely absent ("hiss" noise). Buzz noise is generally due to micro-sparks, corona discharge or partial discharge mechanisms in insulators as a result of the voltage potentials applied by the electric utility. This noise tends to be localized to the source. Hiss noise, as mentioned previously, is related to RF ingress and tends vary much more slowly with distance across larger geographic areas.

Additionally, buzz noise may be predictive of failure of one or more parts of the electric utility network. For example, for overhead power lines such as medium voltage power lines, insulator failure may be result from wear, weather factors, vegetation contact and other causes. One method for locating noisy insulators involves physical surveys, but such surveys are difficult and frequently non-productive since fully quantitative noise measurements are almost impossible with simple, portable equipment that can be operated by utility line personnel. No quantitative and systematic method exists today that allows large areas of the electric utility infrastructure to be monitored for RF noise.

Therefore, there is a need for a systematic, quantitative method of determining information regarding both the type and the location of power line noise sources so that the operator of the system can take appropriate action.

SUMMARY OF THE INVENTION

The present invention provides a method for detecting information regarding both the type and location of noise sources in a power line communication system. In one example embodiment, the invention may be a method comprising the steps of receiving link quality data for a first power line communication link between a first and second power line communications device, determining an asymmetry in the link quality data of the link, and determining location information for the noise source based on the location of the first power line communications device or the location of the second power line communications device.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular methods, process steps, networks, communication systems, computers, terminals, devices, PLCSs, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, PLCSs, computers, terminals, devices, components, techniques, data and network protocols, software products and systems, operating systems, development interfaces, and hardware are omitted so as not to obscure the description of the present invention.

Figure 1:
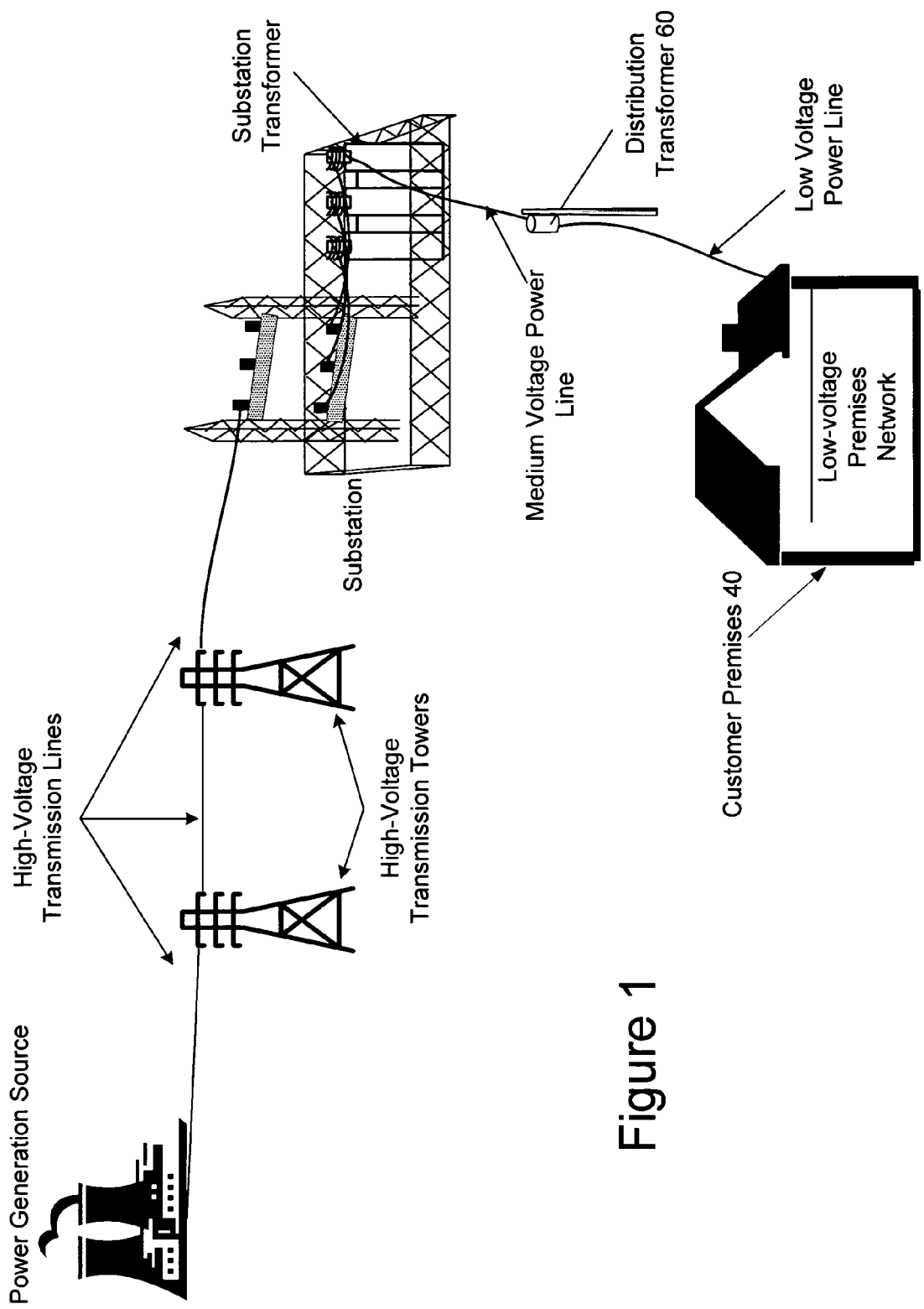
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, the exemplary power distribution systems include MV power lines and LV power lines. As discussed, MV typically ranges from about 1000 V to about 100 kV and LV typically ranges from about 100 V to about 1,000 V. Transformers 60 are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Distribution transformers may be pole-top transformers located on a utility pole, pad-mounted transformers located on the ground, or transformers located under ground level. Power is carried from the distribution transformer to the customer premises 40 via one or more LV power lines.

Figure 2:
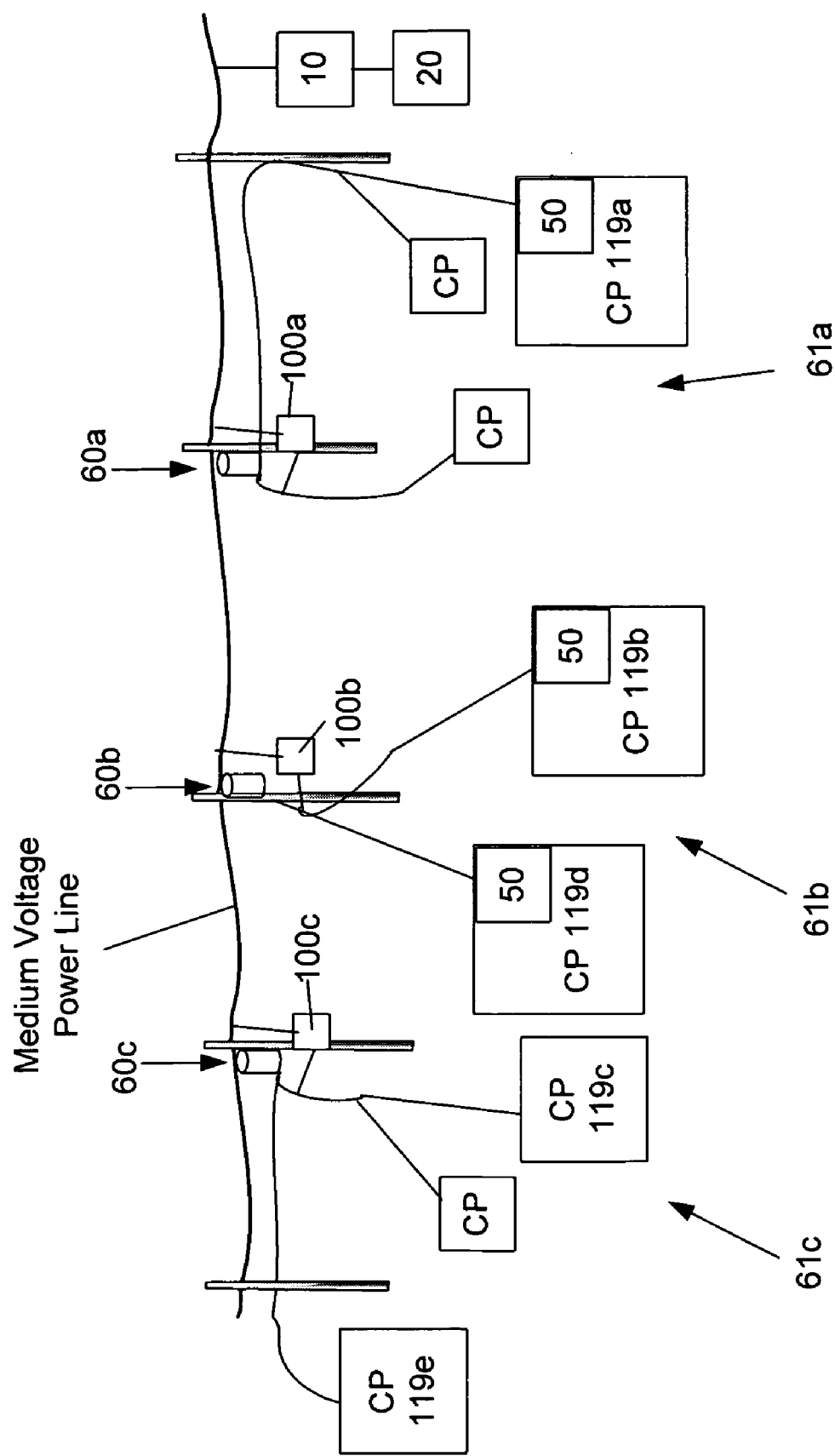
FIG. 2 is a diagram of a portion of an example power line communications system, with which an embodiment of the present invention may be used.

The method of the present invention is applicable for use in conjunction with a power line communication system (PLCS) for communicating signals to and from communication devices at the customer premises through the MV and/or LV power lines. An exemplary portion of a PLCS is shown in FIG. 2 and includes one or more bypass devices (BD) 100 which communicates data signals around the distribution transformer that would otherwise filter such data signals, preventing them from passing through the transformer or significantly degrading them. Thus, the BD 100 is the gateway between the LV power line subnet (i.e., the devices that are communicatively coupled to the LV power lines) and the MV power line and communicates signals to and from user devices at the customer premises (CP) via the low voltage subnet 61. Some PLCS embodiments may include an MV power line repeater, which may comprise a bypass device that repeats data between a BP 10 and another bypass device 100.

In this exemplary embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10 which act as an interface and gateway between a portion of a PLCS (e.g., an MV power line) and a traditional non-power line telecommunications network. One or more backhaul points (BP) 10 are communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

The AP 20 may include a conventional Internet Protocol (IP) data packet router and may be directly connected to an Internet backbone thereby providing access to the Internet. Alternatively, the AP 20 may be connected to a core router (not shown), which provides access to the Internet, or other communication network. Depending on the configuration of the PLCS, a plurality of APs 20 may be connected to a single core router which provides Internet access. The core router (or AP 20 as the case may be) may route voice traffic to and from a voice service provider and route Internet traffic to and from an Internet service provider and/or video provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider.

The aforementioned devices that comprise a typical PLCS will herein collectively be referred to as power line communication devices. Each of the power line communication devices (BD, BP, MV repeater, etc.) may be coupled to each other through power lines and logical channels of communication, which will herein collectively be referred to as communication links.

Preferably, the PLCS also includes a power line server (PLS) that is a computer system with memory for storing a database of information about the PLCS and includes a network element manager (NEM) that monitors and controls the PLCS. The PLS additionally allows network operations personnel to provision users and network equipment, manage customer data, and monitor system status, performance and usage. The PLS may reside at a remote network operations center (NOC), and/or at a PLCS Point of Presence (POP), to oversee a group of power line communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. The PLS also may be connected to one or more APs and/or core routers directly or through the Internet and therefore can communicate with any of the BDs, user devices, and BPs through the respective AP and/or core router.

Typically, the PLS may store the hierarchical configuration of the BP 10, repeating BDs 100, BDs 100 for each MV run in the network in its memory (or database) to help facilitate and maintain the desired route configuration. This hierarchy information may include address and other unique identifying information showing the following for each BP 10: 1) the BDs 100 directly communicating with the BP 10, 2) the BDs 100 directly communicating with the BP 10 and also acting as repeating BDs (RBDs) 100, 3) the BDs 100 communicating through a RBD 100 and also acting as RBDs 100, and 4) the BDs 100 that are communicating through an RBD 100 (and are not acting as an RBD 100).

In a first example embodiment, after initialization of the system the PLS, BP 10 and/or BDs 100 may perform a communication link assessment, which may determine link quality and may include minimum and/or normal communication parameter data. In other words, the system may determine a baseline from which to detect a degradation in communications of the link. Thus, for the link between BP 10 and BD 100a, BP 10 and/or BD 100a may determine performance parameter data for the upstream link (for communications to the BP 10 from BD 100a) and the downstream link (for communications from the BP 10 to BD 100a). The performance parameter data may include bit error rate, data bandwidth (e.g., bits per second), performance data, and/or other data. In addition, data for the upstream and downstream links between the BP 10 and BD 100b and the link between BP 10 and BD 100c may also be determined. The performance parameter data may be stored in the BP 10, the PLS, and/or the BD 100a.

Periodically, and potentially while communicating user data, the BP 10 and/or BDs 100 may assess the link and may determine a degradation in the communication link, which may include detecting a bit error rate (BER) above a predetermined threshold that may be related to (e.g., a percentage over) the average BER measured during the communication link assessment. Alternately, or in addition, detection of a degradation of the communication link may include detecting a decrease in bandwidth below a predetermined threshold, which may be related to (e.g., a percentage below) the average (or mean) bandwidth measured during the communication link assessment. In another embodiment the degradation may be identified when the BER increases above a threshold value. The time of the communication link degradation measurement and the associated degraded performance data may be stored in memory of the BP 10 or BD 100 and also may be transmitted to the PLS.

Figure 3:
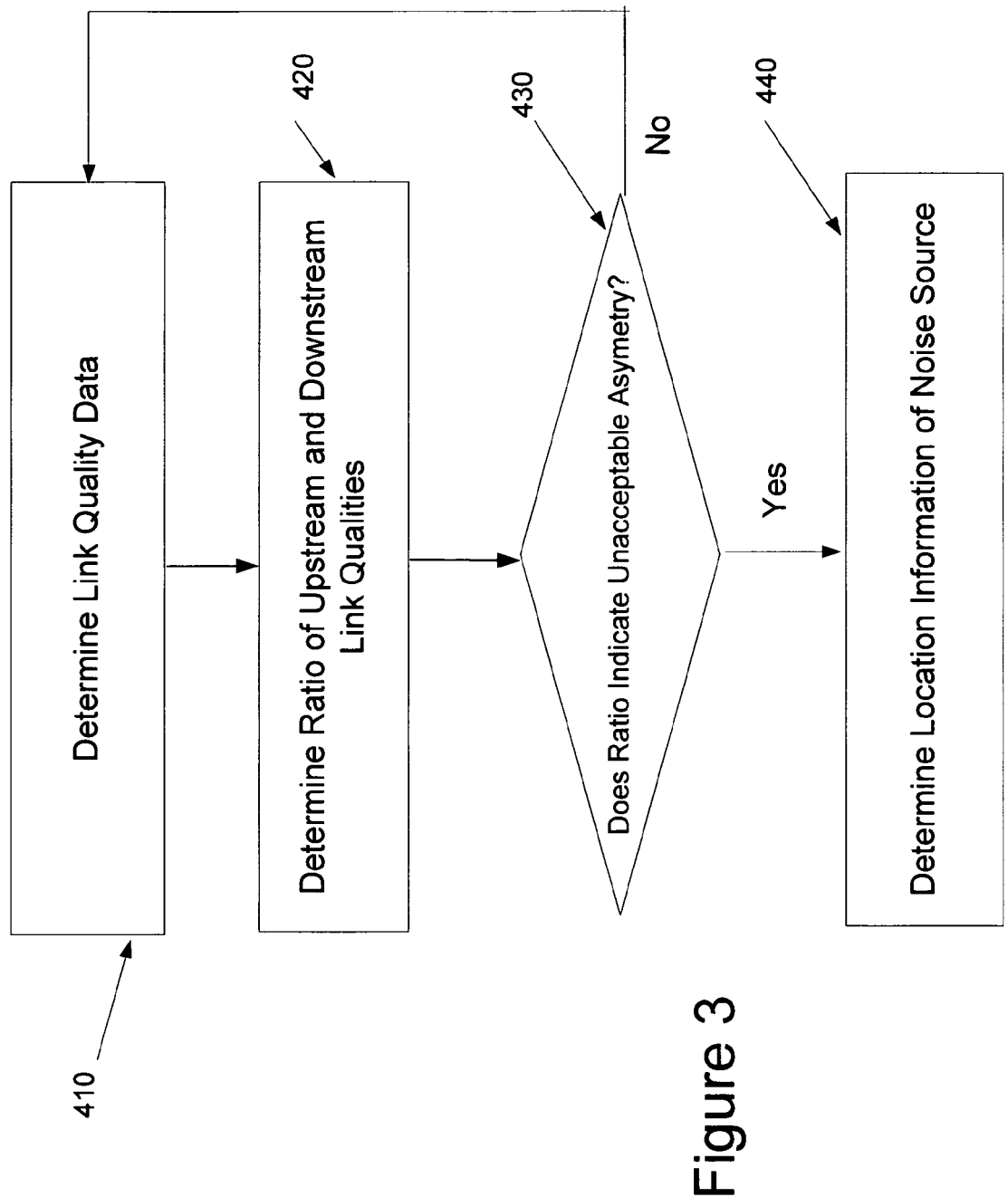
FIG. 3 is a flowchart illustrating the process for determining location information of a noise source in accordance with an example embodiment of the invention.

Referring to FIG. 3, there is shown a flowchart illustrating the process steps for determining location information for a noise source incorporated within the power line communication system 300. In this embodiment, the steps may be preformed in the PLS. In other embodiments, the steps may be performed at a BD 100 or at a BP 10. In either case, the steps may be implemented via executable program code stored in memory that is executed by a processor. In accordance with step 410, the PLS receives link quality data for some or all of the communication links in the PLCS 300. Link quality data may include performance parameter data for both upstream and downstream communication paths between two communication nodes (network elements such as a BP and BD). The link quality data may be used to compute a ratio of the upstream and downstream communication quality at each power line communication device. A useful proxy for such data is the measurement of the count of the data communication bytes received in a certain time period at each power line communication device. By accounting for error correction and transmission speed of the logical channels, the byte count may provide a good approximation of the localized noise at each power line communication device. In turn, the byte count may be the last actual payload conversation or a channel sounding sequence between any two power line communication devices and provides a useful look at the operational link quality between the two power line communication devices within the PLCS.

The modems employed in one example embodiment are substantially compatible with the HomePlug standard. The HomePlug protocol provides a BYTES40 metric, which is a count of the data actually communicated between a pair of stations in the most immediately prior 40 OFDM symbols. The BYTES40 data may be periodically collected at each power line device communication device and transmitted via the PLCS network to the PLS. The PLS stores the received BYTES40 data and compiles a peer table (discussed below) in its memory. In one embodiment, the peer table is arranged in a matrix. It will be understood that other data communication modulation schemes (e.g., CDMA, FDM, TDMA, etc.) will have their own proxies for data payload similar to BYTES40. Other systems may also have different means of assessing the upstream and downstream link performances. Thus, for each particular power line communication link the PLS receives periodic upstream data quality measurements and periodic downstream quality measurements. In one embodiment, every network element has a reasonably current BYTES40 value to every other network element and vice versa.

In accordance with step 420, the PLS may determine a ratio of the upstream and downstream link qualities for each link to provide a Link Ratio. The PLS may form the Link Ratio by dividing the downstream link quality value by the upstream link quality value. As discussed, communication devices such as bypass devices, MV repeaters, and backhaul points are often installed at or near utility equipment such as a distribution transformers. For overhead power line conductors, the communication device will often be mounted to the pole and, therefore, coupled to the power line conductor near the power line insulator, fuses, and other power equipment that may be connected to the MV power line conductor.

If the power line equipment at the same pole or nearby (e.g., at an adjacent pole) generates noise in the frequency band of communications of the PLCS, that noise will attenuate as it travels over the power line conductors. Thus, the noise will be greatest (i.e., have the most power) and cause the most interference to those devices attempting receive data near the noise source. Thus, while a device will generally be able to transmit data in the presence of noise, the noise generally will interfere with receiving data. Devices that are further away typically will not receive the noise or may receive the noise substantially attenuated and, therefore, the noise typically will not impact communications or will not impact communications nearly as much as it impacts those devices located near the noise source. Consequently, in the presence of localized noise both devices may be able to transmit normally, but the device located near localized noise may not be able to receive normally Thus, a Link Ratio that is below or above a predetermined threshold may indicate that one of the devices (the device on the receiving end of the degraded link) may be located near a noise source. Additionally, if weather or non-localized noise (e.g., a television broadcast) impacts the PLCS, both the upstream and downstream link qualities would be impacted (and the ratio would remain one). Consequently, employing a ratio allows detection of localized noise.

After determining the ratio, the PLS may then analyze the Link Ratio for each power line communication link. Perfect symmetry of transmission and reception would result in a ratio of one. Any ratio that does not equal one represents an asymmetry in the upstream and downstream links. A ratio that is a certain threshold greater than or less than one represents an asymmetric ratio that may indicate a source of localized noise near the particular power line communication device that is the receiver having the degraded link.

In accordance with step 430, a decision is made based upon the asymmetry data. If the asymmetry ratio is not above a predetermined threshold or below a predetermined threshold (i.e., is within normal operating parameters), the next link is analyzed at step 410.

If the asymmetry ratio is above the predetermined threshold or below the predetermined threshold, the particular link may be flagged and, in accordance with step 440, the location information of the noise source may be determined.

Each link may be associated with two power line communications devices. As discussed, the noise source will generally be located near the device (e.g., on or near the same utility pole or in the same enclosure) as the device that is the receiver of the degraded upstream or downstream link. If the Link Ratio at a given element is determined by dividing the downstream link quality value by the upstream link quality value, a Link Ratio that is too high would indicate that the upstream device (e.g., a BP) being analyzed is near a noise source. A Link Ratio that is too low would indicate that the downstream device (e.g., a BD) of the link is located near a noise source.

The PLS may store location information for each communication device (network element) and each utility pole. Since each device has a unique assigned identifier, determining location information of the noise requires retrieving location information for the device that is the receiver of the degraded upstream or downstream link. A notification (such as an electronic notification) that includes information (e.g., longitude and latitude or pole number(s)) may be transmitted to the electric utility company by the PLS to repair or monitor the link. Its will be evident to those skilled in the art that some embodiments using a ratio need not first determine a baseline and subsequently determine a degradation because the ratio itself will identify the degradation because the links would be symmetrical absent localized noise.

The peer table may be built using BYTES40 messages transmitted to the PLS by each power line communication devices. As previously described, each physical power line communication device may be assigned a unique identifier. BYTES 40 messages from each power line communication device are tagged with the unique identifier and a time stamp and transmitted to the PLS.

The PLS compiles the data from each individual power line communication device and builds a peer table. A peer table is a listing of each power line communication device and its characteristic upstream/downstream data transmission ratio (Link Ratio). From the values in the peer table, the PLS calculates the mean and the standard deviation of the Link Ratio ratios. In one embodiment, any power line communication device that exhibits a Link Ratio that is outside of the range of values (standard deviation) may be flagged as a particularly noisy power line communication device.

In an alternate embodiment, each network element may receive and transmit data to a plurality of other network elements such as, for example, every other network element of the logical group. The BYTES40 data for each link may then be transmitted from each network element to the PLS. The PLS may then compute an aggregate down/up ratio for each element. This ratio is based on the collective measurement (for each network element) of how well all of the other network elements receive transmissions from that network element divided by the collective measurement of how well that element receives transmissions from all the other network elements. It is worth noting that that all of the signal to noise ratio (SNR) conditions of the entire network are accounted by such a computation and, since each channel must be symmetric, the primary reason (and in many instances the only reason) that the down/up ratio can exceed unity at any point is if that network element is at a noisy location. The method also has a self-consistency check built in. Specifically, the mean of all the down/up ratios will be very close to 1.0, which is an overall statement of channel response symmetry (i.e. conservation of energy). Additionally, the method generally singles out which devices are anomalous by looking at the distribution of the down/up ratios. As a practical matter, typically one is only interested in those network elements where the down/up ratio is a few sigmas (e.g., a predetermine margin) away from the mean. This then localizes the "offender" and the service provider can then look nearby for other network elements that are less asymmetric and thereby further verify the physical localization. Additionally, the ratio methods described herein need not determine a baseline, but may instead identify a noise source (a degradation) based on the ratio(s) (one or more asymmetric links).

In one example peer matrix for such an embodiment, the BP is at the upper left corner and the network elements are arranged both as row and column headings. There are no entries on the diagonal. The top row then represents the downstream direction while the leftmost column represents the upstream. All other entries are inter-element communications. The corresponding entry may be the actual data payload (BYTES40) expressed in bytes.

In one embodiment, the peer table 510 may consist of only similar power line communication devices. This may be advantageous for power line communication devices which have similar or identical characteristics. Grouping identical power line network devices would help to isolate similar characteristic power line communication devices.

As previously described, sometimes the noise is inherent in the system and other noise sources inherent in power transmission (such as sparking or arcing across some power line related hardware). To isolate localized noise, it may be necessary to correlate the peaks and troughs of the noise measurements with the peaks and troughs of the underlying 60 Hz power signal. The power line devices herein may include analog to digital converters for measuring the voltages on the power line. Empirical data may be used to determine whether these additional steps are necessary for proper noise detection for particular power line communication systems.

Figure 4:
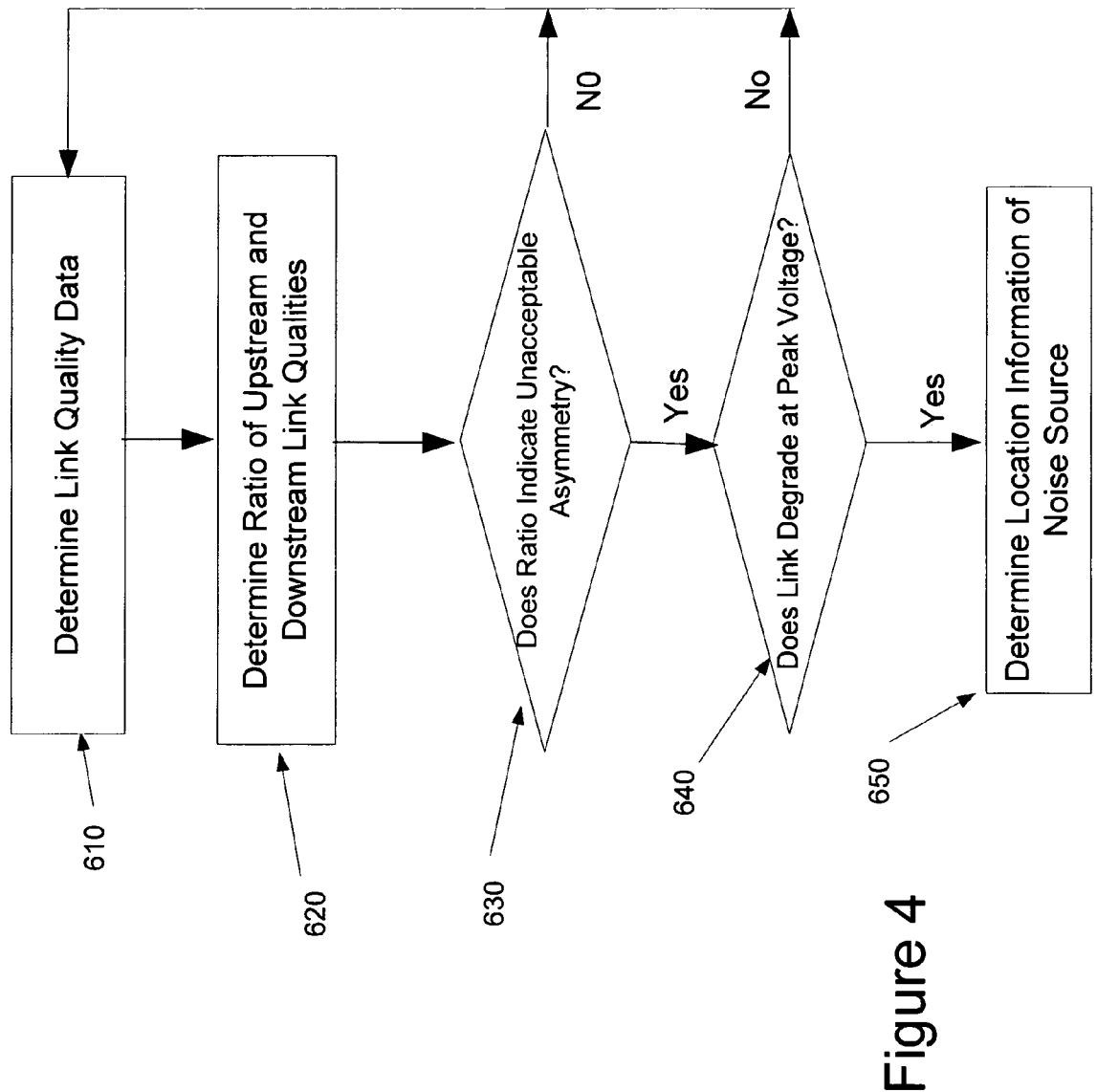
FIG. 4 is a flowchart illustrating the process for determining location information of a noise source in accordance with another example embodiment of the invention.

Thus, in one alternative embodiment, the PLS processes link quality data and correlates the data with the peak voltages to determine whether the noise is synchronized with the peak and/trough of the 60 Hz power signal. Advantageously, by correlating link quality data with related to peak voltages, a higher confidence regarding the characteristics of the noise may be shown. For example, it may permit more accurate predictions that an insulator is near failure. Referring now to FIG. 4, there is shown a flowchart of the process steps for determining further whether the degradation is localized noise.

Steps 610, 620 and 630 mirror steps 410, 420 and 430 as shown in FIG. 4 and will not be described. Once a degradation in the communication link is identified in steps 610, 620 and 630, in accordance with step 640, the PLS may correlate the timing of the link degradation with the voltage measurement at the receiving device. If the link quality between any two power line communication devices degrades on a regular power signal cycle (60 Hz or 120 Hz), there is higher indication of insulator or other potential failure on the medium voltage line that serves to link the two power line communication devices. In accordance with step 650, the location information of the noise source is located as discussed above with respect to step 440 and notification provided.

In still another embodiment, it is determined whether the link quality between any two power line communication devices degrades on a regular power signal cycle (60 Hz or 120 Hz), which may indicate a higher probably of insulator or other potential failure on the medium voltage line that serves to link the two power line communication devices.

A method for determined localized noise location information in a power line communications has been disclosed. Advantageously, the described method avoids the costly couplers and surveys associated with existing methods, while providing a systematic method for keeping track of link communication degradation.

While the described embodiments are illustrated with respect to a PLS performing the described process steps, it will be apparent that any power line communication device may perform the described steps. For example, each bypass device in the power line communication system may be equipped with a small memory and controller functionality so that the upstream/downstream ratio may be calculated at each particular bypass device. The bypass device may then transmit the ratios to the PLS or other network management entity for further analysis. Alternatively, the PLS may periodically transmit to each power line communication device historical statistical parameters (mean, sigmas) so that each power line communication device can alert the PLS when the device exhibits ratios outside of the threshold range.

The bypass devices 100 described herein may include a first modem for communicating over the medium voltage power line, a controller that may include a processor, software, and perform router functions, and a second modem for communicating with one or more user devices over the low voltage power lines or wirelessly. The backhaul point 10 described herein may include a first modem for communicating over the medium voltage power line, a controller that may include a processor, software, and perform router functions, and a second modem for communicating with an upstream device such as the AP.

A detailed description of an example PLCS, its components and features is provided in U.S. patent application Ser. No. 11/091,677 filed Mar. 28, 2005, entitled "Power Line Repeater System and Method," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety.

The backhaul point may be to each phase of the MV power line. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data coupling between the conductors. As a result, the backhaul point 10 may not need to be physically connected to all three phase conductors of the MV cable and transmission from the backhaul point 10 when coupled to one MV phase conductor will be received by the BDs 100 connected to the other MV phase conductors and vice versa. Thus, the links described herein may include devices on different MV power line conductors and in which the data signals couple from one conductor to the other through the air.

Additionally, while the described embodiments are illustrated with respect to a OFDM modulation scheme for data signal communication, it will be apparent that any suitable data signal modulation scheme may be used. The type of signal modulation used can be any suitable signal modulation used in communications such as Code Division Multiple Access (CDMA), Time Division Multiple Access (TDMA), or Frequency Division Multiplex (FDM). A modulation scheme producing a wideband signal such as CDMA or OFDM that is relatively flat in the spectral domain may be used to reduce radiated interference to other systems while still delivering high data communication rates.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of determining location information for a noise source in a power line communication system, comprising:
   receiving link quality data for a first power line communication link between a first and second power line communications device,
   wherein the link quality data includes upstream link quality data and downstream link quality data;
   determining an asymmetry in the upstream link quality data and the downstream link quality of said link; and
   determining location information for the noise source based on the location of the first power line communications device or the location of the second power line communications device.

2. The method of claim 1, wherein determining an asymmetry includes determining that the ratio of the upstream link quality data to the downstream link quality data is above or below a predetermined threshold value.

3. The method of claim 1, wherein an asymmetry in upstream link quality data and the downstream link quality indicates that one of said first and second power line communications devices has degraded reception performance.

4. The method of claim 1, further comprising:
   receiving link quality data for a plurality of power line communication links;
   storing said link quality data of said plurality of power line communication links in a memory.

5. The method of claim 4, wherein determining an asymmetry in the upstream link quality data and the downstream link quality comprises determining a standard deviation value related to the link quality data for said plurality of power line communication links.

6. The method of claim 5, wherein determining an asymmetry in the upstream link quality data and the downstream link quality further comprises:
   determining a mean related to the link quality data for said plurality of power line communication links; and
   determining that a link quality value of the first power line communication link differs from said mean by an amount greater than said standard deviation value.

7. The method of claim 1, wherein determining an asymmetry comprises determining a ratio of an upstream link quality value to a downstream link quality value.

8. The method of claim 1, wherein said determining location information for the noise source comprises determining location information for one of said first and second power line communications devices having degraded reception performance.

9. The method of claim 1, further comprising determining that said asymmetry varies with time.

10. The method of claim 1, wherein said asymmetry varies with time, the method further comprising determining a correlation between the voltage carried by a power line of the power line communication link and said asymmetry.

11. The method of claim 1, wherein said link quality data comprises information of the amount of data received per unit of time.

12. A method of determining location information for a noise source in a power line communication system, comprising:
receiving link quality data for at least one power line communication link between a plurality of power line communications devices;
determining that at least one of said power line communications devices communicating over said at least one power line communication link has degraded reception performance and not degraded transmission performance; and
determining location information for said at least one power line communications devices.

13. The method of claim 12, determining that at least one of said power line communications devices has degraded reception performance comprises identifying an asymmetry in the upstream and downstream link quality of said at least one power line communication link.

14. The method of claim 13, further comprising determining a correlation between the voltage carried by a power line of said at least one power line communication link and said asymmetry.

15. The method of claim 12, further comprising determining a correlation between when said at least one power line communications devices has degraded reception performance and a peak of the voltage carried by a power line of said at least one power line communication link.

16. The method of claim 12, wherein the link quality data includes upstream link quality data and downstream link quality data.

17. The method of claim 12, further comprising:
receiving link quality data for a plurality of power line communication links;
storing said link quality data of said plurality of power line communication links in a memory.

18. The method of claim 17, wherein determining that at least one of said power line communications devices has degraded reception performance comprises determining a standard deviation value related to the link quality data for said plurality of power line communication links.

19. The method of claim 18, wherein determining that at least one of said power line communications devices has degraded reception performance further comprises:
determining a mean related to the link quality data for said plurality of power line communication links; and
determining that a link quality value for said at least one power line communication link differs from said mean by an amount greater than said standard deviation value.

20. The method of claim 12, wherein said link quality data comprises information of the amount of data received per unit of time.

21. The method of claim 12, wherein said link quality data comprises bit error rate information.

22. A method of determining location information for a noise source in a power line communication system, comprising:
receiving link quality data for a plurality of power line communication links;
wherein the link quality data includes data of an upstream link quality and a downstream link quality for each of the plurality of power line communication links;
determining an asymmetry in the upstream and downstream link quality of at least one of said communication links between a first communication device and a second communication device; and
determining that said first communication device communicating over said at least one link has a degraded reception performance and not a degraded transmission performance and that said second communication device communicating over said at least one link does not have a degraded reception performance.

23. The method of claim 22, further comprising determining location information for said first communication device.

24. The method of claim 23, further comprising transmitting said location information to a remote computer.

25. The method of claim 22, wherein said asymmetry varies with time, the method further comprising determining a correlation between the voltage carried by a power line of said at least one link and said asymmetry.

26. The method of claim 22, wherein said link quality data comprises information of the amount of data received per unit of time.

27. The method of claim 22, wherein determining an asymmetry comprises determining a standard deviation of the ratio of the upstream link quality to the downstream link quality for said plurality of power line communication links.

28. The method of claim 27, wherein determining an asymmetry further comprises:
determining a mean of the ratio of the upstream link quality to the downstream link quality for said plurality of power line communication links; and
determining that the ratio of the upstream link quality to the downstream link quality differs from said mean by an amount greater than said standard deviation.

29. A method of determining location information for a noise source in a power line communication system, comprising:
receiving link quality data for a plurality of power line communication links, wherein said link quality data includes upstream link quality data and downstream link quality data;
determining a ratio of the upstream link quality data to the downstream link quality data for each of said plurality of links;
determining that said ratio of one of said links is not within acceptable parameters; and
identifying a communication device communicating over said one link that has degraded reception performance and not degraded transmission performance.

30. The method of claim 29, wherein said ratio of said one of said links varies with time, the method further comprising determining a correlation between the voltage carried by a power line measured at said communication device and said ratio of said one of said links.

31. The method of claim 30, wherein said determining said correlation comprises determining that said ratio varies on a one hundred twenty hertz cycle.

32. A method of determining location information for a noise source in a power line communication system, comprising:
receiving link quality data for a plurality of power line communication links, wherein at least some of said links communicate over the same power line; and processing said link quality data to identify a communication device that has degraded reception performance and not degraded transmission performance.

33. The method of claim 32, wherein said link quality data comprises data of an upstream link quality and a downstream link quality, and said processing comprises:

determining a ratio of the upstream link quality to the downstream link quality for each of said plurality of links; and determining that said ratio for one of said links is not within acceptable parameters.

\* \* \* \* \*